United States Patent
Kim et al.

(10) Patent No.: US 11,201,863 B2
(45) Date of Patent: Dec. 14, 2021

(54) METHOD FOR MANAGING COMPANION DEVICE, AND ELECTRONIC DEVICE USING SAME

(71) Applicant: Samsung Electronics Co., Ltd, Suwon-si (KR)

(72) Inventors: Ji Young Kim, Suwon-si (KR); Hakjoo Kim, Yongin-si (KR); Yong-Jun Park, Suwon-si (KR); Gwiho Lee, Uiwang-si (KR); Ho-Dong Jwa, Suwon-si (KR); Wooyoung Choi, Hwaseong-si (KR)

(73) Assignee: Samsunng Electronics Co., Ltd., Suwon-si (KR)

( * ) Notice: Subject to any disclaimer, the term of this patent is extended or adjusted under 35 U.S.C. 154(b) by 151 days.

(21) Appl. No.: 16/341,849

(22) PCT Filed: Oct. 13, 2017

(86) PCT No.: PCT/KR2017/011328
§ 371 (c)(1),
(2) Date: Apr. 12, 2019

(87) PCT Pub. No.: WO2018/070834
PCT Pub. Date: Apr. 19, 2018

(65) Prior Publication Data
US 2019/0394198 A1 Dec. 26, 2019

(30) Foreign Application Priority Data

Oct. 14, 2016 (KR) ........................ 10-2016-0133825

(51) Int. Cl.
*H04L 29/06* (2006.01)
*G06F 1/16* (2006.01)
(Continued)

(52) U.S. Cl.
CPC .......... *H04L 63/0876* (2013.01); *G06F 21/31* (2013.01); *H04W 12/06* (2013.01)

(58) Field of Classification Search
CPC .......... G06F 21/31; G06F 21/35; G06F 1/163; G06F 2221/2117; H04W 12/06; H04L 63/0876; H04L 29/06
See application file for complete search history.

(56) References Cited

U.S. PATENT DOCUMENTS 6,233,577 B1    5/2001  Ramasubramani et al.
9,882,895 B2 *  1/2018  Woodward .......... H04L 63/0428
(Continued)

FOREIGN PATENT DOCUMENTS

KR   10-2013-0095777 A   8/2013
KR   10-2014-0079697 A   6/2014
(Continued)

OTHER PUBLICATIONS

International Search Report dated Jan. 23, 2018 in connection with International Patent Application No. PCT/KR2017/011328, 3 pages.
(Continued)

*Primary Examiner* — Vu V Tran

(57) ABSTRACT

Various embodiments of the present invention relate to a method for managing a companion device, and an electronic device using the same, the electronic device comprising: a communication unit for connecting a communication channel with at least one first external electronic device; and at least one processor functionally connected with the communication unit, wherein the at least one processor requests, from the at least one first external electronic device, information (companion device authentication information) necessary for registering the at least one first external electronic device as a companion device of a second external electronic device, in response to the connection with the at least one first external electronic device, receives and stores the companion device authentication information, registers the electronic device as a companion device of the second external electronic device when the electronic device is connected with the second external electronic device, and transmits the stored companion device authentication information to the second external electronic device such that the at least one first external electronic device is registered as a
(Continued)

companion device of the second external electronic device. Other various embodiments are possible.

13 Claims, 8 Drawing Sheets

(51) Int. Cl.
  *G06F 21/35* (2013.01)
  *G06F 21/31* (2013.01)
  *H04W 12/06* (2021.01)

(56) References Cited

U.S. PATENT DOCUMENTS

| | | | |
|---|---|---|---|
| 2011/0225640 A1* | 9/2011 | Ganapathy | H04L 67/10 726/8 |
| 2012/0096503 A1 | 4/2012 | Slothouber et al. | |
| 2013/0090169 A1* | 4/2013 | Liu | H04L 12/2829 463/42 |
| 2014/0173063 A1 | 6/2014 | Jeong et al. | |
| 2014/0368603 A1 | 12/2014 | Kert et al. | |
| 2016/0299779 A1* | 10/2016 | Kulkarni | H04W 4/80 |
| 2016/0301772 A1 | 10/2016 | Yang et al. | |
| 2016/0373270 A1 | 12/2016 | Yang et al. | |
| 2017/0006471 A1 | 1/2017 | Kim et al. | |
| 2017/0201612 A1* | 7/2017 | Donley | G06F 21/35 |

FOREIGN PATENT DOCUMENTS

| | | |
|---|---|---|
| KR | 10-2014-0090624 A | 7/2014 |
| KR | 10-2015-0073827 A | 7/2015 |
| KR | 10-2015-0092873 A | 8/2015 |
| KR | 10-2016-0022308 A | 2/2016 |
| WO | 2015/072764 A1 | 5/2015 |

OTHER PUBLICATIONS

Written Opinion of the International Searching Authority dated Jan. 23, 2018 in connection with International Patent Application No. PCT/KR2017/011328, 4 pages.

* cited by examiner

METHOD FOR MANAGING COMPANION DEVICE, AND ELECTRONIC DEVICE USING SAME

CROSS-REFERENCE TO RELATED APPLICATIONS

This application is a 371 of International Application No. PCT/KR2017/011328 filed on Oct. 13, 2017, which claims priority to Korean Patent Application No. 10-2016-0133825 filed on Oct. 14, 2016, the disclosures of which are herein incorporated by reference in their entirety.

BACKGROUND

1. Field

Embodiments of the present disclosure relate to a method for managing a companion device and an electronic device using the same.

2. Description of Related Art

With the enhancement of technology, users using various portable electronic devices are increasing. For example, users use various portable electronic devices such as smartphones, wearable electronic devices, tablets, or the like. The portable electronic devices may be connected with other portable electronic devices through various connection methods and authentication methods. In addition, the portable electronic devices may be connected with a computer through various connection methods and authentication methods.

However, to connect the plurality of portable electronic devices to a computer, users should perform authentication and connection with respect to the devices, respectively. In addition, the portable electronic devices should support interfaces for connecting to the computer, and the computer should support all of the connection methods and authentication methods supported by the various portable electronic devices. To this end, related-art connection methods between electronic devices may cause inconvenience to users.

Various embodiments of the present disclosure to solve the above-mentioned problem can easily register and manage a plurality of electronic devices as companion devices.

SUMMARY

According to various embodiments of the present disclosure, an electronic device includes: a communication unit configured to connect a communication channel with at least one first external electronic device; and at least one processor functionally connected with the communication unit, wherein the at least one processor is configured to: request, from the at least one first external electronic device, information (companion device authentication information) necessary for registering the at least one first external electronic device as a companion device of a second external electronic device, in response to the connection with the at least one first external electronic device; receive the companion device authentication information from the at least one first external electronic device and to store the companion device authentication information; register the electronic device as a companion device of the second external electronic device when the electronic device is connected with the second external electronic device; and transmit the stored companion device authentication information to the second external electronic device such that the at least one first external electronic device is registered as a companion device of the second external electronic device.

According to various embodiments, an electronic device may include: a communication unit configured to connect a communication channel with at least one first external electronic device; and at least one processor functionally connected with the communication unit, wherein the at least one processor is configured to: register the at least one first external electronic device as a companion device of the electronic device in response to the connection with the at least one first external electronic device; receive companion device authentication information regarding at least one second external electronic device from the at least one first external electronic device; and register the at least one second external electronic device as a companion device, based on the received companion device authentication information.

According to various embodiments of the present disclosure, a method for managing a companion device of an electronic device includes: connecting, by the electronic device, with at least one first external electronic device; requesting, by the electronic device, connection information (companion device authentication information) necessary for registering the at least one first external electronic device as a companion device of a second external electronic device from the at least one first external electronic device; receiving the companion device authentication information from the at least one first external electronic device, and storing the companion device authentication information; and registering the electronic device as a companion device of the second external electronic device when the electronic device is connected with the second external electronic device, and transmitting the stored companion device authentication information to the second external electronic device such that the at least one first external electronic device is registered as a companion device of the second external electronic device.

According to various embodiments of the present disclosure, when an electronic device is registered as a companion device of another electronic device (for example, a computer), the other electronic devices connected with (or registered at) the electronic device can also be registered as companion devices. Therefore, user's convenience can be enhanced. In addition, another electronic device can store information of the registered companion devices in the form of a database, and provide a management function. Therefore, user's convenience can be enhanced. For example, a user can change authority setting (for example, the term of validity) of the companion devices or can easily delete a specific companion device through a management function.

DETAILED DESCRIPTION

Figure 1:
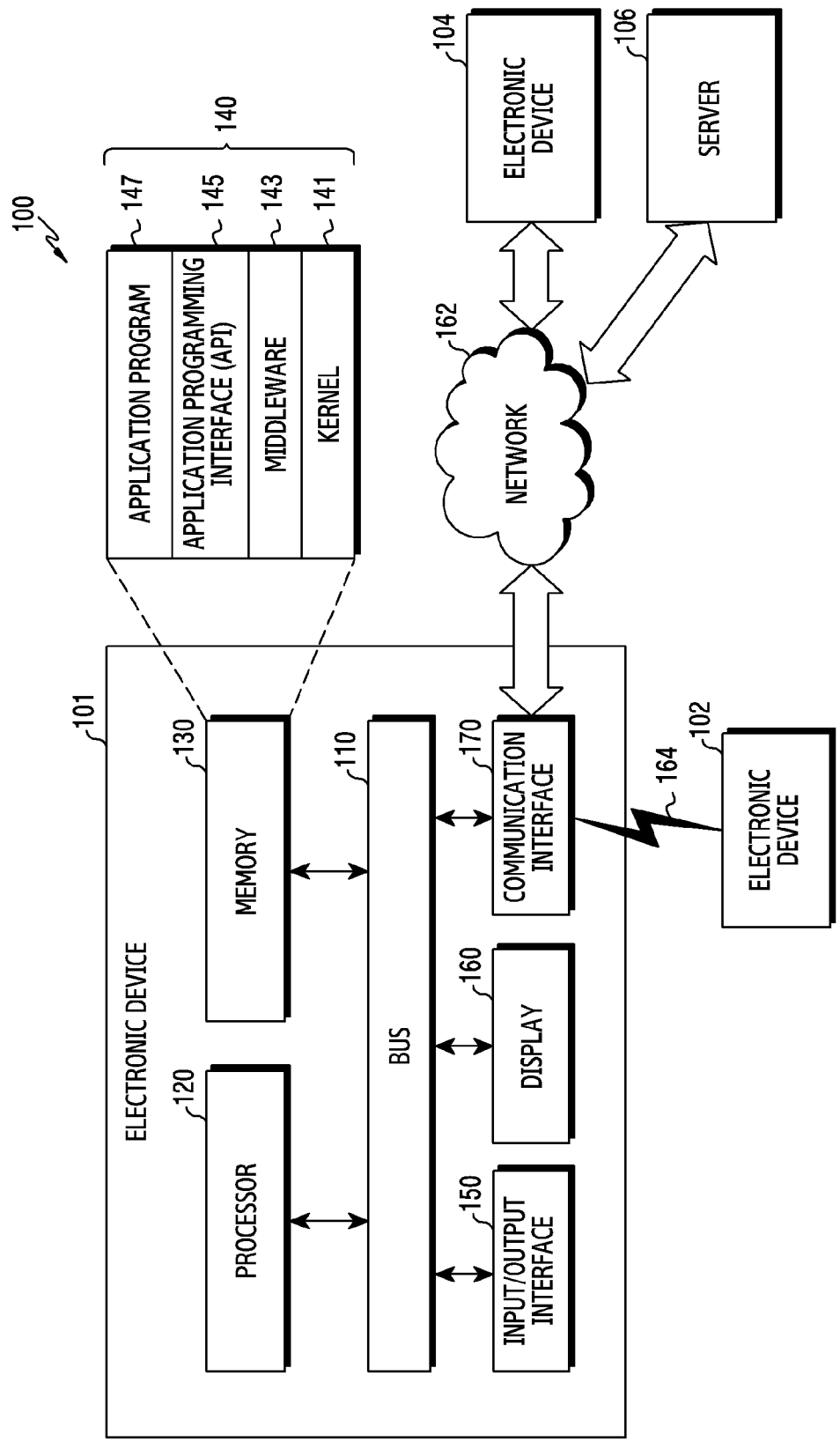
FIG. 1 is a view illustrating an electronic device in a network environment according to an embodiment of the present disclosure.

Various embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" also include plural referents unless the context clearly dictates otherwise. In the present disclosure, an expression such as "A or B," "at least one of A and B" or "one or more of A and B" may include all possible combinations of the listed items. Expressions such as "first," "second," "primarily," or "secondary," as used herein, may represent various elements regardless of order and/or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element).

The expression "configured (or set) to", as used in the present disclosure, may be used interchangeably with, for example, "suitable for," "having the capacity to," "designed to," "adapted to," "made to," or "capable of", according to the situation. The term "configured (or set) to" does not only refer to "specifically designed to" in hardware. Alternatively, in some situations, the expression "apparatus configured to" may refer to a situation in which the apparatus "may" operate together with another apparatus or component. The phrase "a processor configured (or set) to perform A, B, and C" may be a dedicated processor, a general-purpose processor (such as a central processing (CPU) or an application processor (AP)) that may perform a corresponding operation by executing at least one software program stored in a dedicated processor (such as an embedded processor) for performing a corresponding operation or in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, and the like, but is not limited thereto.

In an embodiment of the present disclosure, the electronic device may be at least one of various medical devices (such as, various portable medical measuring devices (a blood sugar level measuring device, a heartbeat measuring device, a blood pressure measuring device, or a body temperature measuring device), a magnetic resonance angiography (MRA) device, a magnetic resonance imaging (MM) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and a gyro compass), avionics, a security device, a head unit for a vehicle, an industrial or home robot, a drone, an automated teller machine (ATM), a point of sales (POS) device, and an Internet of things (IoT) device (e.g., a light bulb, various sensors, a sprinkler device, a fire alarm, a thermostat, a street light, a toaster, sports equipment, a hot water tank, a heater, and a boiler), and the like, but is not limited thereto. According to an embodiment of the present disclosure, the electronic device may be at least one of a portion of furniture, building/construction or vehicle, an electronic board, an electronic signature receiving device, a projector, and various measuring devices (e.g., water supply, electricity, gas, or electric wave measuring device), and the like, but is not limited thereto. An electronic device may be a flexible electronic device or a combination of two or more of the foregoing various devices. An electronic device is not limited to the foregoing devices, and may be embodied as a newly developed electronic device. The term "user", as used herein, may refer to a person using an electronic device or a device using an electronic device (e.g., an artificial intelligence electronic device).

FIG. 1 is a block diagram of an electronic device in a network environment, according to an embodiment of the present disclosure.

Referring to FIG. 1, the a network environment 100 may include the electronic device 101. The electronic device 101 includes a bus 110, a processor 120, a memory 130, an input/output interface 150, a display 160, and a communication interface 170. The electronic device 101 may be provided without at least one of the components, or may include at least one additional component. The bus 110 may include a circuit for connecting the components 120 through 170 and delivering communication signals (e.g., control messages or data) therebetween. The processor 120 may include one or more of a CPU, an AP, and a communication processor (CP). The processor 120, for example, may perform an operation or data processing with respect to control and/or communication of at least another component of the electronic device 101.

The memory 130 may include a volatile and/or nonvolatile memory. The memory 130, for example, may store commands or data relating to at least another component of the electronic device 101. According to an embodiment of the present disclosure, the memory 130 may store software and/or a program 140. The program 140 includes, for example, a kernel 141, middleware 143, an application programming interface (API) 145, and/or an application program (or applications) 147. At least part of the kernel 141, the middleware 143, or the API 145 may be referred to as an operating system (OS). The kernel 141 may control or manage system resources (e.g., the bus 110, the processor 120, or the memory 130) used for performing operations or functions implemented by the other programs (e.g., the middleware 143, the API 145, or the applications 147). Additionally, the kernel 141 may provide an interface for controlling or managing system resources by accessing an individual component of the electronic device 101 from the middleware 143, the API 145, or the applications 147.

The middleware 143, for example, may serve an intermediary role for exchanging data between the API 145 or the applications 147 and the kernel 141 through communication. Additionally, the middleware 143 may process one or more job requests received from the applications 147, based on their priority. The middleware 143 may assign a priority for using a system resource (e.g., the bus 110, the processor 120, or the memory 130) of the electronic device 101 to at least one of the applications 147, and process the one or more job requests. The API 145, as an interface through which the applications 147 controls a function provided from the kernel 141 or the middleware 143, may include, for example, at least one interface or function (e.g., an instruction) for file control, window control, image processing, or character control. The input/output interface 150, for example, may deliver commands or data input from a user or another external device to other component(s) of the electronic device 101, or output commands or data input from the other component(s) of the electronic device 101 to the user or another external device.

The display 160, for example, may include a liquid crystal display (LCD), a light emitting diode (LED) display, an organic light emitting diode (OLED) display, a microelectromechanical systems (MEMS) display, or an electronic paper display, and the like, but is not limited thereto. The display 160, for example, may display various content (e.g., texts, images, videos, icons, and/or symbols) to the user. The display 160 may include a touch screen, for example, and receive touch, gesture, proximity, or hovering inputs by using an electronic pen or a user's body part. The communication interface 170, for example, may set communications between the electronic device 101 and an external device (e.g., a first external electronic device 102, a second external electronic device 104, or a server 106. The communication interface 170 may communicate with the second external electronic device 104 or the server 106 over a network 162 through wireless communication or wired communication.

The wireless communication, for example, may include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include, for example, at least one of wireless fidelity (Wi-Fi), light fidelity (Li-Fi), Bluetooth™, Bluetooth™ low energy (BLE), Zigbee, near field communication (NFC), magnetic secure transmission, radio frequency (RF), and body area network (BAN). The wireless communication may include GNSS. The GNSS may include, for example, global positioning system (GPS), global navigation satellite system (GLONASS), Beidou navigation satellite system (Beidou), or Galileo (the European global satellite-based navigation system). Hereafter, the term GPS may be interchangeably used with the term GNSS. The wired communication, for example, may include at least one of universal serial bus (USB), high definition multimedia interface (HDMI), recommended standard 232 (RS-232), power line communications, and plain old telephone service (POTS). The network 162 may include a telecommunications network, for example, at least one of a computer network (e.g., LAN or WAN), the Internet, and a telephone network.

Each of the first and second external electronic devices 102 and 104 may be of the same type or of a different type from that of the electronic device 101. According to an embodiment of the present disclosure, all or part of operations executed in the electronic device 101 may be executed by another electronic device or a plurality of electronic devices (e.g., the electronic device 102 or 104, or the server 106). To perform a function or service automatically or by request, instead of performing the function or the service by the electronic device 101, the electronic device 101 may request at least part of a function relating thereto from the electronic device 102 or 104, or the server 106. The electronic device 102 or 104, or the server 106 may perform the requested function or an additional function and send its result to the electronic device 101. The electronic device 101 may provide the requested function or service by processing the received result. In doing so, for example, cloud computing, distributed computing, or client-server computing techniques may be used.

Figure 2:
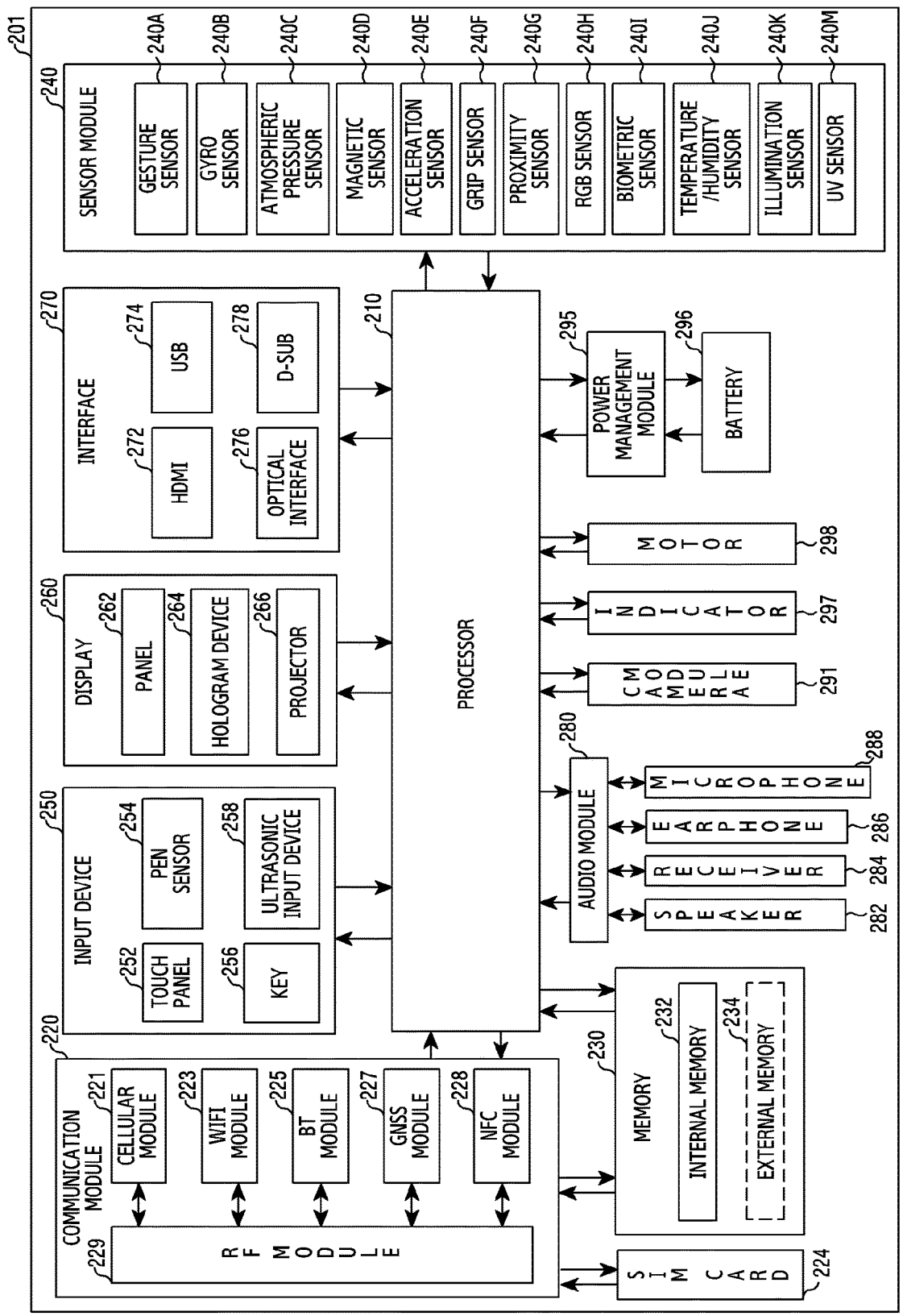
FIG. 2 is a block diagram of an electronic device according to an embodiment of the present disclosure.

FIG. 2 is a block diagram of an electronic device, according to an embodiment of the present disclosure. The electronic device 201, for example, may include all or part of the above-described electronic device 101 of FIG. 1. The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, may control a plurality of hardware or software components connected to the processor 210, and also may perform various data processing and operations by executing an OS or an application program. The processor 210 may be implemented with a system on chip (SoC), for example. The processor 210 may further include a graphic processing unit (GPU) and/or an image signal processor. The processor 210 may include at least part (e.g., a cellular module 221) of the components illustrated in FIG. 2. The processor 210 may load commands or data received from at least one other component (e.g., a nonvolatile memory) into a volatile memory, process the commands, and store various data in the nonvolatile memory.

The communication module 220 may have the same or similar configuration as the communication interface 170 of FIG. 1. The communication module 220 may include, such as, the cellular module 221, a Wi-Fi module 223, a Bluetooth™ (BT) module 225, a GNSS module 227, an NFC module 228, and an RF module 229. The cellular module 221, for example, may provide voice call, video call, short message service (SMS), or Internet service through a communication network. The cellular module 221 may identify and authenticate the electronic device 201 in a communication network by using the SIM 224. The cellular module 221 may perform at least part of a function that the processor 210 provides. The cellular module 221 may further include a CP. At least some (e.g., two or more) of the cellular module 221, the Wi-Fi module 223, the BT module 225, the GNSS module 227, and the NFC module 228 may be included in one integrated circuit (IC) or an IC package. The RF module 229, for example, may transmit/receive a communication signal (e.g., an RF signal). The RF module 229, for example, may include a transceiver, a power amp module (PAM), a frequency filter, a low noise amplifier (LNA), or an antenna. At least one of the cellular module 221, the Wi-Fi module 223, the BT module 225, the GNSS module 227, and the NFC module 228 may transmit/receive an RF signal through an additional RF module. The SIM 224, for example, may include a card or an embedded SIM, and also may contain unique identification information (e.g., an integrated circuit card identifier (ICCID)) or subscriber information (e.g., an international mobile subscriber identity (IMSI)).

The memory 230 (e.g., the memory 130) may include at least one of an internal memory 232 or an external memory 234. The internal memory 232 may include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 may include flash drive, for example, compact flash (CF), secure digital (SD), micro SD, mini SD, extreme digital (xD), multi-media card (MMC), or memory stick. The external memory 234 may be functionally or physically connected to the electronic device 201 through various interfaces.

The sensor module 240 may, for example, measure physical quantities or detect an operating state of the electronic device 201, and convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor). The sensor module 240 may also include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. The electronic device, as part of the processor 210 or individually, may further include a processor configured to control the sensor module 240 and control the sensor module 240 while the processor 210 is sleeping.

The input device 250, for example, may include at least one of a touch panel 252, a (digital) pen sensor 254, a key 256, and an ultrasonic input device 258. The touch panel 252 may use at least one of, for example, capacitive, resistive, infrared, and ultrasonic methods. Additionally, the touch panel 252 may further include a control circuit. The touch panel 252 may further include a tactile layer to provide a tactile response to a user. The (digital) pen sensor 254 may include, for example, part of a touch panel or a sheet for recognition. The key 256 may include, for example, a physical button, a touch key, an optical key, or a keypad. The ultrasonic input device 258 may detect ultrasonic waves from a microphone 288 and check data corresponding to the detected ultrasonic waves.

The display 260 (e.g., the display 160) may include at least one of a panel 262, a hologram device 264, a projector 266, and/or a control circuit for controlling them. The panel 262 may be flexible, transparent, or wearable, for example. The panel 262 and the touch panel 252 may be configured with one or more modules. The panel 262 may include a pressure sensor (or a force sensor) for measuring a pressure of the user touch. The pressure sensor may be integrated with the touch panel 252, or include one or more sensors separately from the touch panel 252. The hologram device 264 may show three-dimensional images in the air by using the interference of light. The projector 266 may display an image by projecting light on a screen. The screen, for example, may be placed inside or outside the electronic device 201. The interface 270, for example, may include an HDMI 272, a USB 274, an optical interface 276, or a D-subminiature (D-sub) 278. The interface 270 may be included in, for example, the communication interface 170 of FIG. 1. Additionally or alternately, the interface 270 may include a mobile high-definition link (MHL) interface, a SD card/MMC interface, or an infrared data association (IrDA) standard interface.

The audio module 280, for example, may convert sounds into electrical signals and convert electrical signals into sounds. At least some components of the audio module 280 may be included in, for example the input/output interface 150 of FIG. 1. The audio module 280 may process sound information input or output through a speaker 282, a receiver 284, an earphone 286, or the microphone 288. The camera module 291, as a device for capturing still images and videos, may include one or more image sensors (e.g., a front sensor or a rear sensor), a lens, an image signal processor (ISP), or a flash (e.g., an LED or a xenon lamp). The power management module 295, for example, may manage the power of the electronic device 201. According to an embodiment of the present disclosure, the power management module 295 may include a power management IC (PMIC), a charger IC, or a battery gauge, for example. The PMIC may have a wired and/or wireless charging method. The wireless charging method may include, for example, a magnetic resonance method, a magnetic induction method, or an electromagnetic method, and may further include an additional circuit for wireless charging, for example, a coil loop, a resonant circuit, or a rectifier circuit. The battery gauge may measure the remaining charge capacity of the battery 296, or a voltage, current, or temperature of the battery 296 during charging. The battery 296 may include, for example, a rechargeable battery and/or a solar battery.

The indicator 297 may display a specific state of the electronic device 201 or part thereof (e.g., the processor 210), for example, a booting state, a message state, or a charging state. The motor 298 may convert electrical signals into a mechanical vibration and generate a vibration or haptic effect. The electronic device 201 may include a mobile TV supporting device (e.g., a GPU) for processing media data according to standards such as digital multimedia broadcasting (DMB), digital video broadcasting (DVB), or MediaFlo™. Each of the above-described components of the electronic device may be configured with at least one component and the name of a corresponding component may vary according to the kind of electronic device. According to an embodiment of the present disclosure, the electronic device 201 may be configured to include at least one of the above-described components or an additional component, or to not include some of the above-described components. Additionally, some of components in an electronic device are configured as one entity, so that functions of previous corresponding components are performed identically.

Figure 3:
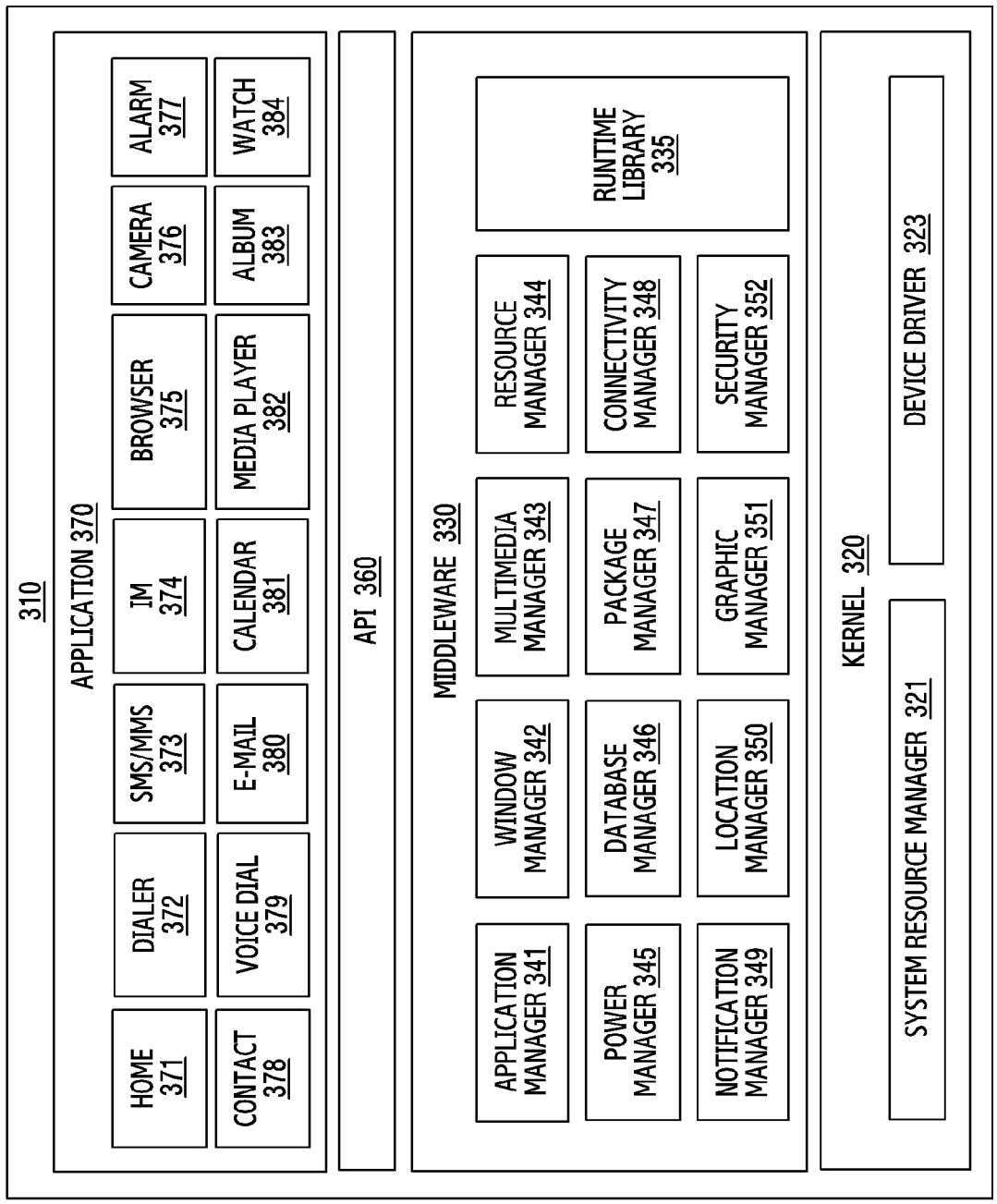
FIG. 3 is a block diagram of a program module according to an embodiment of the present disclosure.

FIG. 3 is a block diagram of a program module, according to an embodiment of the present disclosure. A program module 310 (e.g., the program 140) may include an OS for controlling a resource relating to the electronic device 101 and/or the applications 147 running on the OS. The OS may include, for example, Android™, iOS™, Windows™, Symbian™, Tizen™, or Bada™. Referring to FIG. 3, the program module 310 includes a kernel 320 (e.g., the kernel 141), a middleware 330 (e.g., the middleware 143), an API 360 (e.g., the API 145), and/or an application 370 (e.g., the applications 147). At least part of the program module 310 may be preloaded on an electronic device or may be downloaded from an external electronic device (e.g., the first external electronic device 102, the second external electronic device 104, or the server 106).

The kernel 320 includes, for example, at least one of a system resource manager 321 and/or a device driver 323. The system resource manager 321 may control, allocate, or retrieve a system resource. According to an embodiment of the present disclosure, the system resource manager 321 may include a process management unit, a memory management unit, or a file system management unit. The device driver 323 may include, for example, a display driver, a camera driver, a Bluetooth™ driver, a shared memory driver, a USB driver, a keypad driver, a Wi-Fi driver, an audio driver, or an inter-process communication (IPC) driver. The middleware 330, for example, may provide a function commonly required by the application 370, or may provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is running. The runtime library 335 may manage input/output, manage memory, or arithmetic function processing. The application manager 341, for example, may manage the life cycle of the applications 370. The window manager 342 may manage a GUI resource used in a screen. The multimedia manager 343 may recognize a format for playing various media files and encode or decode a media file by using the codec in a corresponding format. The resource manager 344 may manage a source code of the application 3740 or a memory space. The power manager 345 may manage the capacity, temperature, and/or power of the battery, and determine or provide power information for an operation of the electronic device using corresponding information among the capacity, temperature, and/or power of the battery. The power manager 345 may operate together with a basic input/output system (BIOS). The database manager 346 may create, search, or modify a database used in the application 370. The package manager 347 may manage installation or updating of an application distributed in a package file format.

The connectivity manager 348 may manage, for example, a wireless connection. The notification manager 349 may provide an event, such as incoming messages, appointments, and proximity alerts, to the user. The location manager 350 may manage location information of an electronic device. The graphic manager 351 may manage a graphic effect to be provided to the user or a user interface relating thereto. The security manager 352 may provide, for example, system security or user authentication. The middleware 330 may include a telephony manager for managing a voice or video call function of the electronic device, or a middleware module for combining various functions of the above-described components. The middleware 330 may provide a module specialized for each type of OS. The middleware 330 may dynamically delete part of the existing components or add new components. The API 360, as a set of API programming functions, may be provided as another configuration according to the OS. For example, Android or iOS may provide one API set for each platform, and Tizen may provide two or more API sets for each platform.

The application 370 includes at least one of a home 371, a dialer 372, an SMS/multimedia messaging system (MMS) 373, an instant message (IM) 374, a browser 375, a camera 376, an alarm 377, a contact 378, a voice dial 379, an e-mail 380, a calendar 381, a media player 382, an album 383, a clock 384. Additionally, the application 370 may include health care (e.g., measure an exercise amount or blood sugar level), or environmental information (e.g., air pressure, humidity, or temperature information) application. The application 370 may include an information exchange application for supporting information exchange between the electronic device and an external electronic device. The information exchange application may include, for example, a notification relay application for relaying specific information to the external device or a device management application for managing the external electronic device. The notification relay application may relay notification information from another application of the electronic device to an external electronic device, or receive and forward notification information from an external electronic device to the user. The device management application, for example, may install, delete, or update a function (e.g., turn-on/turn off of the external electronic device itself (or some components) or display brightness (or resolution) adjustment) of an external electronic device communicating with the electronic device, or an application operating in the external electronic device. The application 370 may include a specific application (e.g., a health care application of a mobile medical device) according to a property of the external electronic device. The application 370 may include an application received from an external electronic device. At least part of the program module 310 may be implemented (e.g., executed) with software, firmware, hardware (e.g., the processor 210), or a combination of at least two of them, and include a module, a program, a routine, a set of instructions, or a process for executing one or more functions.

Figure 4:
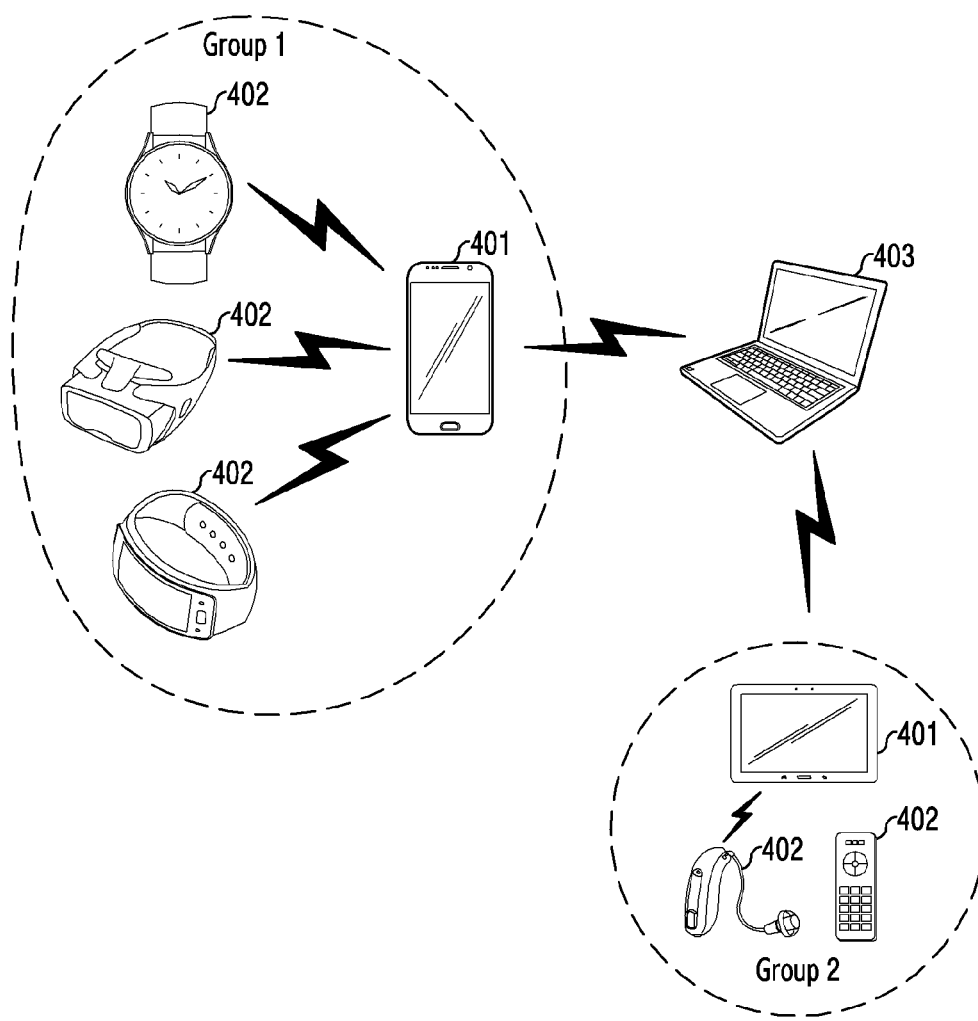
FIG. 4 is a view to illustrate a method for managing a companion device according to an embodiment of the present disclosure.

FIG. 4 is a view to illustrate a method for managing a companion device according to an embodiment of the present disclosure.

Referring to FIG. 4, at least one electronic device 401 according to an embodiment of the present disclosure may be connected with at least one first external electronic device 402. For example, the at least one electronic device 401 may be connected with the at least one first external electronic device 402 through wired communication (for example, USB) or wireless communication (for example, Bluetooth, WiFi, WiFi direct, Zigbee, NFC, infrared data association (IrDA), home radio frequency (RF), digital living network alliance (DLNA), or the like).

The electronic device 401 may be a smartphone or a tablet. The first external electronic device 402 may be a wearable device. For example, the first external electronic device 402 may be a smart watch, a head mounted device, a Bluetooth earphone, or an IoT device (for example, a door lock, a bulb, a fire alarm, a boiler, a refrigerator, or the like). However, the electronic device 401 and the first external electronic device 402 according to various embodiments of the present disclosure are not limited thereto.

The electronic device 401 according to an embodiment of the present disclosure may store companion device authentication information regarding the at least one first external electronic device 402. The companion device authentication information may be information necessary for registering the first external electronic device 402 as a companion device of a second external electronic device 403. For example, when a connection with the first external electronic device 402 is completed, the electronic device 401 may request the first external electronic device 402 connected therewith to transmit the companion device authentication information. The first external electronic device 402 may generate companion device authentication information and may transmit the same to the electronic device 401. For example, the first external electronic device 402 may generate a device ID, a private key/public key, and a device unique address, and may transmit the device ID, the public key, and the device unique address to the electronic device 401 and may store the private key.

The electronic device 401 may store at least one piece of companion device authentication information received from the at least one first external electronic device 402 in the form of a database (or table). For example, the electronic device 401 may store the companion device authentication information regarding the at least one first external electronic device 402 in the form of a database as shown in <Table 1> and <Table 2> presented below. The database may be stored in a security area.

tication/unauthentication, a protocol method, a function of a device, a capability of a device, or the like.

The electronic device 401 may be connected with the second external electronic device 403. For example, the electronic device 401 may be connected with the second external electronic device 403 through wired communication (for example, USB) or wireless communication (for example, Bluetooth, WiFi, WiFi direct, Zigbee, NFC, IrDA, home RF, DLNA, or the like). The second external electronic device 403 may be a personal computer which operates by the Window™ OS. However, various embodiments of the present disclosure are not limited thereto. For example, the second external electronic device 403 may be various electronic devices which operate by various OSs (for example, Mac OS, Linux™ OS, Unix™ OS, Android™ OS, or the like).

According to various embodiments of the present disclosure, the second external electronic device 403 may perform authentication with respect to the electronic device 401. For example, the second external electronic device 403 may authenticate a user by using a biometric sensor included in the electronic device 401, or may authenticate the user by using an authentication certificate. However, various embodiments of the present disclosure are not limited thereto, and well-known various authentication methods may be used.

When the authentication is completed, the second external electronic device 403 may perform a registration procedure to register the electronic device 401 as a companion device. For example, the second external electronic device 403 may register the electronic device 401 as a companion device through a companion device framework (CDF). Herein, the procedure to register the electronic device 401 as a companion device through the companion device framework may be performed according to a standard procedure supported by each OS. A detailed description of this is omitted.

When the electronic device 401 is registered as the companion device of the second external electronic device 403, the electronic device 401 may transmit, to the second

TABLE 1

| Device Type | Device ID | Public Key | Device Unique Address |
|---|---|---|---|
| Smart watch 1 | {8D695E10-8357-4A30-81EF-2E0D3CD6259E} | {DDCC9F1C-43C0-4691-BF53-ED2F23A1D0F6} | F4:34:5F:43:B1:C2 |
| HMD | {5B6D42C8-46E9-4DF6-8EE5-8F93845BDE65} | {F27F6883-898A-4991-8502-AA5F04F2AD66} | A4:34:5B:23:C1:02 |
| Smart watch 2 | {2E0D3CD6-259E-46E9-4DF6-AA5F04F2AD66} | {BF536883-D0F6-F27F-898A-499104F2DDFQ} | 43:B1:C2:A4:34:5B |

TABLE 2

| Device Type | Device ID | Public Key | Device Unique Address |
|---|---|---|---|
| Bluetooth earphone | {7R693E10-2356-4A30-81GA-E20D3C6D295E} | {CDCD91FC-D63C-B6Q1-35BF-GD2FCXA1D06F} | 4F:57:F5:13:BG:C7 |
| Door lock | {B46D42C8-76E9-9D46-8GE3-F9AB845BD65T} | {M77F6883-GG8A-49UW-82K3-AG5404F3AD61} | AA:T1:B5:2G:C5:AA |

<Table 1> and <Table 2> described above are merely examples, and do not limit various embodiments of the present disclosure. For example, the database may further include information, for example, a network type, authenexternal electronic device 403, the companion device authentication information regarding the first external electronic devices 402 stored in the database.

The second external electronic device 403 may register the at least one first external electronic device 402 as a companion device by using the companion device authentication information regarding the first external electronic device 402. The second external electronic device 403 may store information regarding the registered companion devices in the form of a database. For example, the second external electronic device 403 may store the information regarding the registered electronic devices in the form of the database as shown in <Table 3> presented below.

TABLE 3

| group | Device Type | Device ID | Device Unique Address | Authentication Key | Device Key |
|---|---|---|---|---|---|
| 1 | Smartphone | {DN695EYT-57UE-A3T0-1M3F-RW0D3CD65GWE} | T3:29:FF:3T:C1:C2 | {7F68RE83-8OPA-CT49-8502-JL5F0F72AD61} | {2143AFF7-9R1A-C8FE-9733-556A7F3D96BY} |
| 1 | Smart watch 1 | {8D695E10-8357-4A30-81EF-2E0D3CD6259E} | F4:34:5F:43:B1:C2 | {F27F6883-898A-4991-8502-AA5F04F2AD66} | {87222FF7-291A-4CFE-9033-54F6A73D96B9} |
| 1 | HMD | {5B6D42C8-46E9-4DF6-8EE5-8F93845BDE65} | A4:34:5B:23:C1:02 | {DDCC9F1C-43C0-4691-BF53-ED2F23A1D0F6} | {208705C7-ADEB-4956-9779-27FD2A920C3D} |
| 1 | Smart watch 2 | {2E0D3CD6-259E-46E9-4DF6-AA5F04F2AD66} | 43:B1:C2:A4:34:5B | {DCCDF91G-3DC0-G691-HF5F-D32F2A21D0G6} | {H8724FF7-8A1A-4CFE-9779-4YF6B73D9B92} |
| 2 | Tablet | {3C6D295E-81GA-35P0-2356-E2035OPD295E} | 57:T4:F5:22:6G:7R | {DG6F23A1-YT67-CFF3-1234-C1CD9F1CD06F} | {YUF6M73D-QWFE-A56L-W375-22FAABF79CBZ} |
| 2 | Bluetooth earphone | {7R693E10-2356-4A30-81GA-E20D3C6D295E} | 4F:57:F5:13:BG:C7 | {C1CD9F1C-99C0-8891-CFF3-DG6F23A1D06F} | {22FAABF7-A56L-QWFE-W0H3-YUF6M73D9CBZ} |
| 2 | Door lock | {B46D42C8-76E9-9D46-8GE3-F9AB845BD65T} | AA:T1:B5:2G:C5:AA | {KTKC9F1G-QQC0-V6N1-BN57-ZD2FG3A1DKFL} | {XR222FF7-R91A-R5FE-R033-R4F6A73D96T2} |

Referring to <table 3>, the second external electronic device 403 may group the registered companion devices, and may store the same. For example, the second external electronic device 403 may store a smartphone, and a smart watch 1, an HMD, and a smart watch 2 which are connected to the smartphone, as a first group, and may store a tablet and a Bluetooth earphone and a door lock which are connected to the tablet, as a second group.

In <Table 3> described above, an authentication key may be generated by combining a device ID and a device unique address and encrypting the combination by an encryption algorithm. A device key may be generated by encrypting a device ID. However, embodiments of the present disclosure are not limited thereto, and the authentication key and the device key may be generated by using well-known various encryption technologies. For example, the authentication key and the device key may be generated as random values through a security module such as a trusted platform module (TPM).

After the registration of the companion device is completed, when the electronic device 401 and the first external electronic device 402 access within a communication range, the second external electronic device 403 may detect the accessing, may be automatically connected, and may provide various services. For example, the second external electronic device 403 may provide services such as unlocking, auto logging-in, payment approval, data transmission, or the like, by using the companion device.

The second external electronic device 403 may provide a management (for example, editing) function (or service) regarding the stored companion device information. For example, the second external electronic device 403 may provide a management function of setting a limit (for example, setting the term of validity) regarding each of the registered devices, deleting a specific companion device, or changing the term of validity.

As described above, the electronic device 401 according to various embodiments of the present disclosure may store companion device authentication information regarding the previously connected first external electronic devices 402, and, when the electronic device 401 is registered as a companion device of the second external electronic device 403, the electronic device 401 may provide (transmit) the companion device authentication information to the second external electronic device 403, such that the first external electronic devices 402 can also be registered as companion devices of the second external electronic device 403. In other words, according to various embodiments of the present disclosure, the first external electronic device 402 can be registered as a companion device of the second external electronic device 403 without being connected with the second external electronic device 403 via wired or wireless communication.

Figure 5:
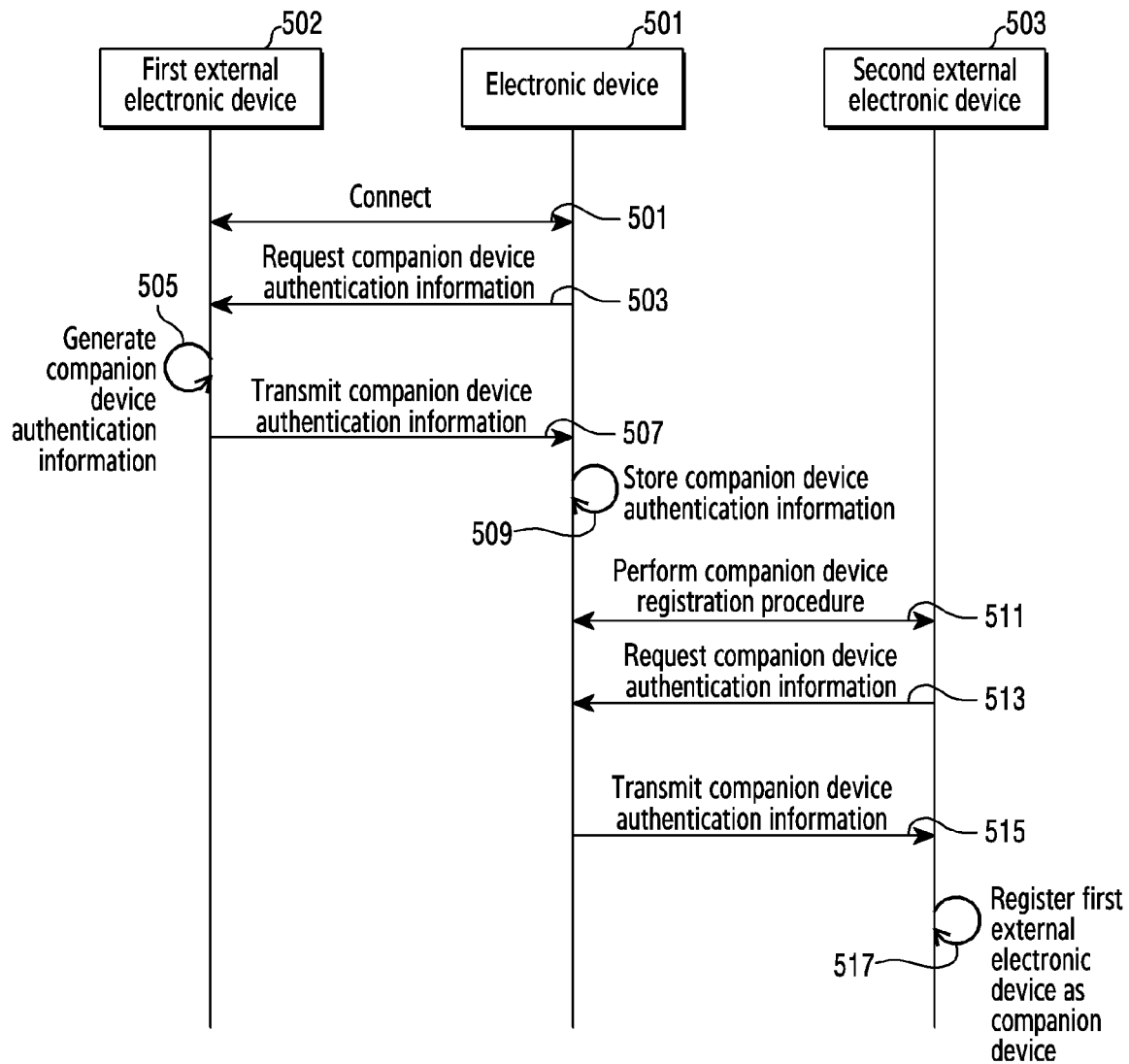
FIG. 5 is a flowchart illustrating a method for registering a companion device according to an embodiment of the present disclosure.

FIG. 5 is a flowchart illustrating a method for registering a companion device according to various embodiments of the present disclosure. An electronic device 501 according to various embodiments of the present disclosure may be connected with a plurality of first external electronic devices, but prior to describing in detail, it is assumed that the electronic device 501 is connected with one first external electronic device 502 for convenience of explanation Referring to FIG. 5, in operation 501, the electronic device 501 (for example, the electronic device 101 of FIG. 1, the electronic device 201 of FIG. 2, the electronic device 401 of FIG. 4) according to an embodiment of the present disclosure may be connected with the first external electronic device 502 (for example, the electronic device 102 of FIG. 1, the electronic device 402 of FIG. 4). For example, the electronic device 501 may connect a communication channel with the first external electronic device 502 through wired communication or wireless communication. To connect the communication channel, the electronic device 501 and the first external electronic device 502 may perform authentication by using a pre-defined authentication method (for example, entering a password, exchanging a pin number, or the like).

In operation 503, the electronic device 501 may request companion device authentication information from the first external electronic device 502. In operation 505, in response to the request, the first external electronic device 502 may generate companion device authentication information. For example, the first external electronic device 502 may generate a device ID, a private key/public key, and a device unique address.

In operation 507, the first external electronic device 502 may transmit the generated companion device authentication information to the electronic device 501. For example, the first external electronic device 502 may transmit the device ID, the public key and the device unique address to the electronic device 501.

In operation 509, the electronic device 501 may store the received companion device authentication information. For example, the electronic device 501 may store the companion device authentication information in the form of a database. The electronic device 501 may store the database in a security area.

In operation 511, the electronic device 501 and a second external electronic device 503 may perform a companion device registration procedure. For example, the second external electronic device 503 may register the electronic device 501 as its own companion device by performing the companion device registration procedure with the electronic device 501 by using a companion device framework (CDF). Herein, the device registration procedure is well-known technology and thus a detailed description thereof is omitted. According to a certain embodiment, the electronic device 501 and the second external electronic device 503 may perform authentication before operation 511. For example, the electronic device 501 and the second external electronic device 503 may perform authentication through biometric information (for example, fingerprint information, iris information, or the like) or an authentication certificate. However, various embodiments of the present disclosure are not limited thereto, and may use various authentication methods.

In operation 513, the second external electronic device 503 may request the companion device authentication information of the first external electronic device 502 from the electronic device 501. In operation 515, the electronic device 501 may transmit the companion device authentication information of the first external electronic device 502 to the second external electronic device 503.

In operation 517, the second external electronic device 503 may register the first external electronic device 502 as a companion device by using the received companion device authentication information.

According to a certain embodiment, operation 513 may be omitted. For example, when operation 511 is completed, the electronic device 501 may transmit the companion device authentication information of the first external electronic device 502 stored therein to the second external electronic device 503.

According to a certain embodiment, the electronic device 501 may request companion device authentication information from only the first external electronic devices authenticated through the authentication method set in operation 501, and may receive the information and store the same in the form of a database.

According to a certain embodiment, the electronic device 501 may share the database having the companion device authentication information stored therein with the first external electronic device 502. This is to allow the electronic device 501 to be registered as a companion device of the second external electronic device 503 when the first external electronic device 502 is registered as a companion device of the second external electronic device 503.

According to various embodiments of the present disclosure as described above, the electronic device 501 stores the companion device authentication information of the first external electronic device 502 connected therewith in the form of a database, such that the first external electronic device 502 can be registered as a companion device of the second external electronic device 503 when the electronic device 501 is registered as a companion device of the second external electronic device 503. Accordingly, user's convenience can be enhanced.

Figure 6:
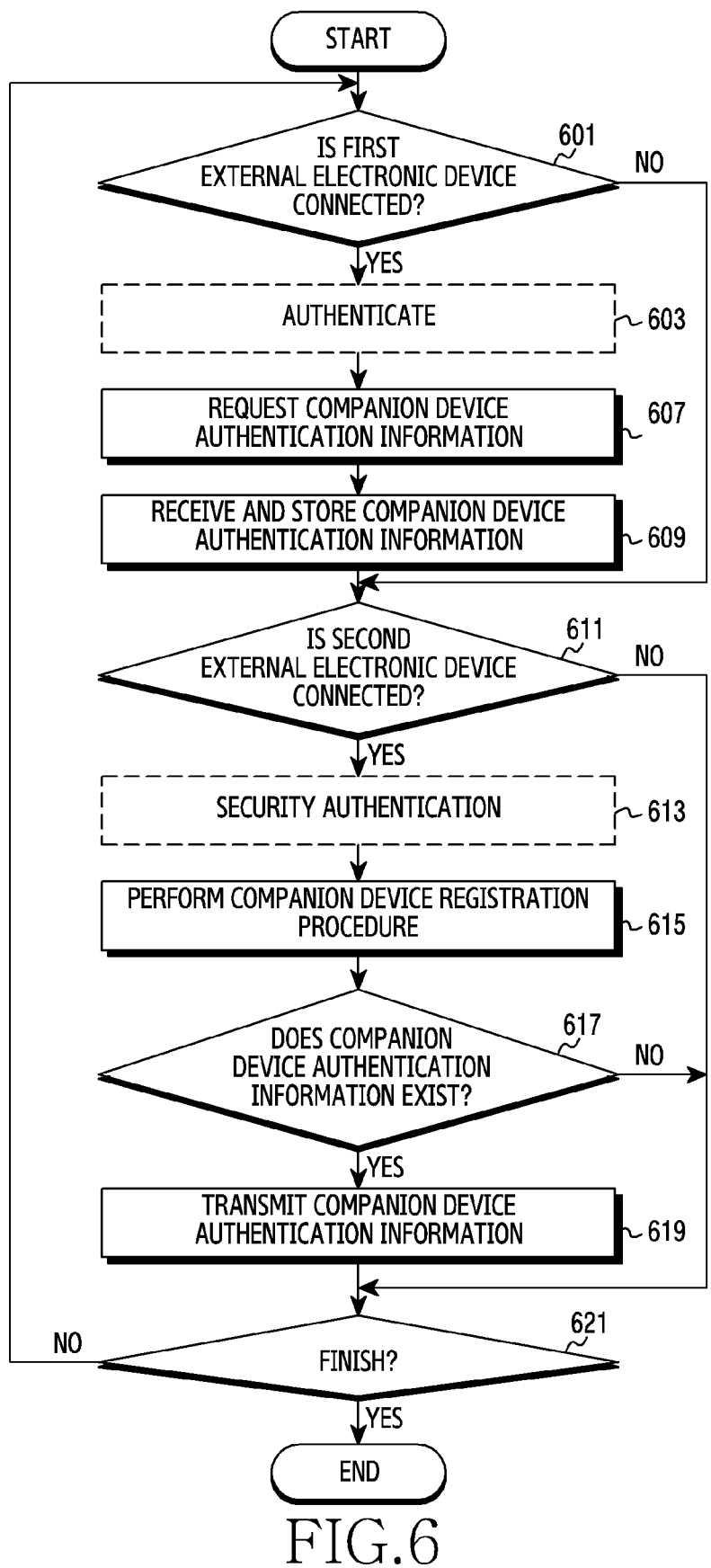
FIG. 6 is a sequence diagram illustrating a method for registering a companion device of an electronic device according to an embodiment of the present disclosure.

FIG. 6 is a sequence diagram illustrating a method for registering a companion device of an electronic device according to various embodiments of the present disclosure.

Referring to FIG. 6, in operation 601, a processor (for example, the processor 120 of FIG. 1, the processor 210 of FIG. 2) of an electronic device according to various embodiments of the present disclosure may identify whether the electronic device is connected with a first external electronic device (for example, the electronic device 102 of FIG. 1, the first external electronic device 402 of FIG. 4, the first external electronic device 502 of FIG. 5). For example, the processor may identify whether the electronic device is connected with the first external electronic device through wired or wireless communication.

When the electronic device is not connected with the first external electronic device in operation 601, the processor may proceed to operation 611.

When the electronic device is connected with the first external electronic device in operation 601, the processor may proceed to operation 603 to perform authentication. For example, the processor may perform authentication (for example, entering a password, entering a pin number, etc.) through a pre-defined authentication method. According to a certain embodiment, operation 603 may be omitted.

In operation 607, the processor of the electronic device according to an embodiment of the present disclosure may request companion device authentication information from the first external electronic device. For example, the processor of the electronic device may request an ID, a public key, and a unique address of the device from the first external electronic device.

In operation 609, the processor of the electronic device according to an embodiment of the present disclosure may receive the companion device authentication information from the first external electronic device, and may store the same. The received companion device authentication information may be stored in the form of a database (or table). The database may be stored in a security area.

In operation 611, the processor of the electronic device according to an embodiment of the present disclosure may identify whether the electronic device is connected with a second external electronic device. For example, the electronic device may be connected with the second external electronic device through wired or wireless communication. The second external electronic device may be a computer using the window OS. However, various embodiments of the present disclosure are not limited thereto, and the second external electronic device may be various electronic devices using various OSs.

When the electronic device is not connected with the second external electronic device in operation 611, the processor may proceed to operation 621, which will be described below. On the other hand, when the electronic device is connected with the second external electronic device in operation 611, the processor may proceed to operation 613 to perform security authentication. For example, the processor may activate a biometric sensor (for example, a fingerprint recognition sensor, an iris recognition sensor, a camera, or the like) and may obtain user's biometric information (for example, fingerprint information, iris information, face recognition), and may authenticate whether the user is appropriate (has authority) by comparing the obtained biometric information and pre-stored biometric information. In another embodiment, the processor may authenticate the user through a public certificate pre-stored in the electronic device. For example, the processor may output a UI screen through which a password of the public certificate is entered, and may authenticate the user by comparing the password inputted through the UI screen and a pre-set password.

In operation 615, the processor of the electronic device according to an embodiment of the present disclosure may perform a companion device registration procedure to register the electronic device as a companion device of the second external electronic device. For example, the processor may perform the registration procedure by using a companion device framework (CDF). To achieve this, the processor may transmit the device ID of the electronic device and the unique address of the device to the second external electronic device.

In operation 617, the processor of the electronic device according to an embodiment of the present disclosure may identify whether there exists companion device authentication information regarding the first external electronic device pre-stored.

When there does not exist the companion device authentication information in operation 617, the processor may proceed to operation 621, which will be described below. On the other hand, when there exists the companion device authentication information in operation 617, the processor may proceed to operation 619 to transmit the companion device authentication information to the second external electronic device. For example, the processor may transmit a device ID and a device unique address of the first external electronic device to the second external electronic device.

In operation 621, the processor of the electronic device according to an embodiment of the present disclosure may identify whether termination is requested. When the termination is not requested, the processor may return to operation 601 to repeat the above-described operations. On the other hand, when the termination is requested, the processor may finish the above-described procedure.

A method for managing a companion device of an electronic device according to various embodiments of the present disclosure may include: connecting, by the electronic device, with at least one first external electronic device; requesting, by the electronic device, connection information (companion device authentication information) necessary for registering the at least one first external electronic device as a companion device of a second external electronic device from the at least one first external electronic device; receiving the companion device authentication information from the at least one first external electronic device, and storing the companion device authentication information; and registering the electronic device as a companion device of the second external electronic device when the electronic device is connected with the second external electronic device, and transmitting the stored companion device authentication information to the second external electronic device such that the at least one first external electronic device is registered as a companion device of the second external electronic device.

According to various embodiments, the method may further include performing user authentication when the electronic device is connected with the second external electronic device.

According to various embodiments, the companion device authentication information may include a device type, a device ID, a public key, and a device unique address.

According to various embodiments, the storing may include storing the companion device authentication information in a security area of a memory.

According to various embodiments, the method may further include performing authentication when the electronic device is connected with the at least one first external electronic device, and the requesting may include requesting the at least one authenticated first external electronic device to transmit the companion device authentication information.

According to various embodiments, the registering the electronic device as the companion device of the second external electronic device may include registering the electronic device as the companion device of the second external electronic device by using a companion device framework.

Figure 7:
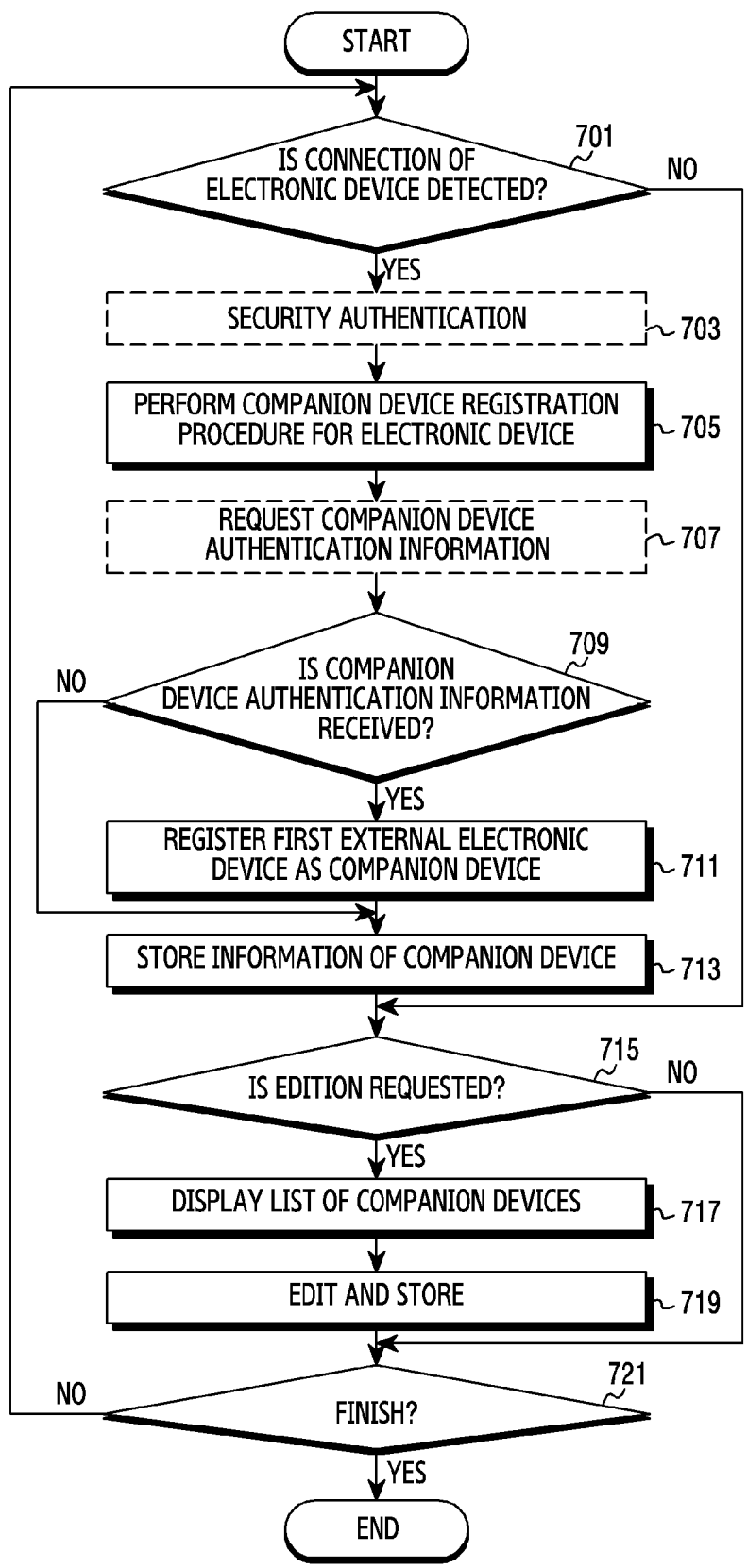
FIG. 7 is a sequence diagram illustrating a method for registering a companion device of a second external electronic device according to an embodiment of the present disclosure.

FIG. 7 is a sequence diagram illustrating a method for registering a companion device of a second external electronic device according to various embodiments of the present disclosure.

Referring to FIG. 7, a processor of the second external electronic device (for example, the second external electronic device 403 of FIG. 4, the second external electronic device 503 of FIG. 5) may identify whether the second external electronic device is connected with an electronic device (for example, the electronic device 101 of FIG. 1, the electronic device 201 of FIG. 2, the electronic device 401 of FIG. 4, the electronic device 501 of FIG. 5) in operation 701. For example, the processor may identify whether the electronic device is connected through wired or wireless communication.

When the second external electronic device is not connected with the electronic device in operation 701, the processor may proceed to operation 715, which will be described below. On the other hand, when the second external electronic device is connected with the electronic device in operation 701, the processor may proceed to operation 703 to perform security authentication. For example, the processor may authenticate a user through biometric information or an authentication certificate.

In operation 705, the processor of the second external electronic device according to an embodiment of the present disclosure may perform a companion device registration procedure for the electronic device. For example, the processor may perform the registration procedure by using a companion device framework (CDF). To achieve this, the processor may receive a device ID and a unique address of the electronic device from the electronic device.

After the registration procedure is completed, the processor of the second external electronic device according to an embodiment of the present disclosure may request companion device authentication information of a first external electronic device from the electronic device in operation 707. According to an embodiment, operation 707 may be omitted. For example, after the registration procedure is completed, the second external electronic device may perform operation 709, which will be described below.

In operation 709, the processor of the second external electronic device according to an embodiment of the present disclosure may identify whether the companion device authentication information is received. When the companion device authentication information is not received in operation 709, the processor may proceed to operation 713, which will be described below. On the other hand, when the companion device authentication information is received in operation 709, the processor may proceed to operation 711 to register the first external electronic device as a companion device by using the received companion device authentication information.

In operation 713, the processor of the second external electronic device according to an embodiment of the present disclosure may store information regarding registered companion devices. For example, the processor may store connection information regarding the electronic device and/or the first external electronic devices which are registered as companion devices in the form of a database.

In operation 715, the processor of the second external electronic device according to an embodiment of the present disclosure may identify whether an editing request is detected. When the editing request is not detected in operation 715, the processor may proceed to operation 721, which will be described below. On the other hand, when the editing request is detected in operation 715, the processor may proceed to operation 717 to display a list of registered companion devices on a screen.

In operation 719, the processor of the second external electronic device according to an embodiment of the present disclosure may edit (delete, set the term of validity, or the like) information of the companion devices in response to the user's request, and may store the edited information of the companion devices.

In operation 721, the processor of the second external electronic device according to an embodiment of the present disclosure may identify whether termination is requested. When the termination is not requested, the processor may return to operation 701 to repeat the above-described operations. On the other hand, when the termination is requested, the processor may finish the above-described procedure.

A method for managing a companion device of an electronic device (for example, a second external electronic device) according to various embodiments of the present disclosure may include the operations of: connecting the electronic device with at least one first external electronic device; registering the at least one first external electronic device as a companion device of the electronic device; receiving companion device authentication information regarding at least one second external electronic device from the at least one first external electronic device; and registering the at least one second external electronic device as a companion device.

According to various embodiments, the method may further include an operation of performing user authentication when the electronic device is connected with the at least one first external electronic device.

According to various embodiments, the method may further include an operation of storing information regarding the registered companion devices in a memory.

According to various embodiments, the operation of registering the at least one first external electronic device as the companion device of the electronic device may include an operation of registering the at least one first external electronic device as the companion device of the electronic device by using a companion device framework.

Figure 8:
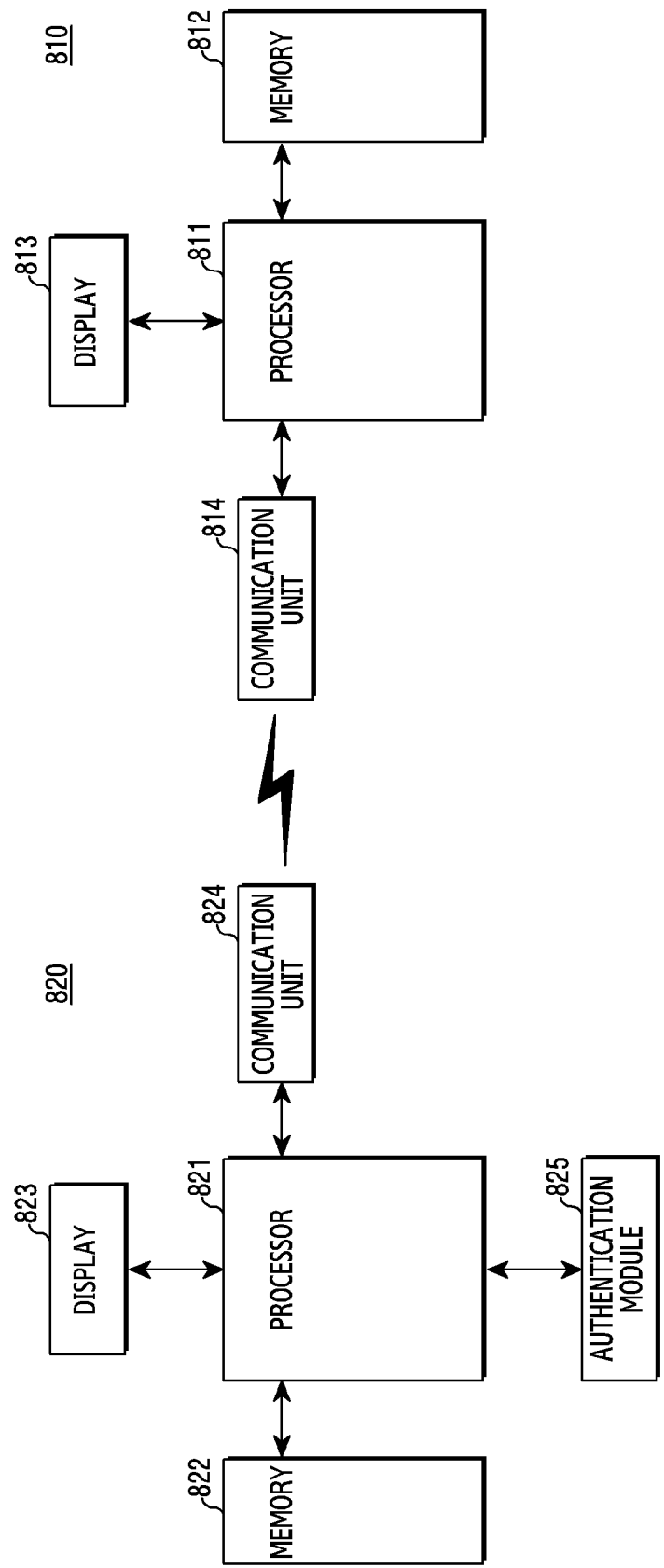
FIG. 8 is a block diagram illustrating configurations of electronic devices according to an embodiment of the present disclosure.

FIG. 8 is a block diagram illustrating configurations of electronic devices according to an embodiment of the present disclosure.

Referring to FIG. 8, an embodiment of the present disclosure may include a first electronic device 810 and a second electronic device 820.

The first electronic device 810 (for example, the second external electronic device 403 of FIG. 4, the second external electronic device 503 of FIG. 5) may include a processor 811, a memory 812, a display 813, and a communication unit 814.

The processor 811 may control an overall operation of the first electronic device 810. In other words, the processor 811 may control respective elements of the first electronic device 810. For example, the processor 811 may receive instructions from the memory 812, may control the respective elements according to the received instructions, and may perform various functions. The processor 811 may be formed with a central processing unit (CPU), an application processor (AP), a micro control unit (MCU), or the like. The processor 811 may be formed with a single core processor or a multi-core processor. In another embodiment, the processor 811 may be a multi-processor including a plurality of processors.

According to various embodiments, the processor 811 may perform a security authentication procedure when detecting a connection with the second electronic device 820. When authentication is completed, the processor 811 may perform a companion device registration procedure to register the second electronic device 820 as a companion device. In addition, the processor 811 may receive companion device authentication information from the second electronic device 820, and may also register at least one other electronic device as a companion device.

According to various embodiments, the processor 811 may control a function of managing (for example, editing) the registered companion devices. For example, the processor 811 may set and/or change the term of validity regarding the registered companion devices, or may delete a registered companion device in response to a user's request.

The memory 812 may store various programs for operating the first electronic device 810, and may store data generated during the performance of the various programs, or downloaded data. In addition, the memory 812 may store various commands and/or instructions for operating the processor 811. The memory 812 may include at least one of an internal memory or an external memory.

According to various embodiments, the memory 812 may store information regarding the registered companion devices. The information may include a group, a device type, a device ID, a device unique address, an authentication key, a device key. The information may be stored in the form of a database. The information may be stored in a security area of the memory 812.

The display 813 may provide an output function. The display 813 may be formed with, for example, a liquid crystal display (LCD), a light emitting diode (LED) display, an organic LED (OLED) display, or a micro electro mechanical system (MEMS) display, or an electronic paper display. The display 813 may be implemented to be flexible, transparent, or wearable.

The display 813 may display, for example, various contents (for example, a text, an image, a video, an icon, and/or a symbol). The display 813 according to various embodiments may display a screen for managing the companion devices. For example, the display 813 may display a management screen to delete a companion device or to set the term of validity.

The communication unit 814 may perform a communication function. The communication unit 814 may perform communication wiredly or wirelessly. For example, the communication unit 814 may include a USB communication module, a WiFi communication module, a Bluetooth (BT) communication module, a near field communication (NFC) module, or the like. According to an embodiment, at least some (for example, two or more) of the WiFi communication module, the BT communication module, the NFC module, or a GPS module may be included in a single integrated chip (IC) or an IC package.

The second electronic device 820 (for example, the electronic device 101 of FIG. 1, the electronic device 201 of FIG. 2, the electronic device 401 of FIG. 4, the electronic device 501 of FIG. 5) may include a processor 821, a memory 822, a display 823, a communication unit 824, and an authentication module 825. Prior to describing in detail, similar elements to those of the first electronic device 810 will not be described for convenience of explanation.

When the second electronic device is connected with at least one external electronic device (not shown) through the communication unit 824, the processor 821 may request the external electronic device to transmit companion device authentication information, and may receive and store the companion device authentication information. The processor 821 may store the companion device authentication information in a security area of the memory 822 in the form of a database.

The processor 821 may perform a security authentication procedure when detecting a connection with the first electronic device 810. For example, the processor 821 may obtain user's biometric information through the authentication module 825, and may perform user authentication. In another embodiment, the processor 821 may perform user authentication through an authentication certificate stored in the memory 822.

When authentication is completed, the processor 821 may perform a companion device registration procedure with the first electronic device 810. In addition, the processor 821 may transmit the companion device authentication information to the first electronic device 810, and may control to register the external electronic devices as companion devices of the first electronic device 810.

The authentication module 825 may perform a user authentication procedure. For example, the authentication module 825 may include a biometric sensor (for example, a fingerprint recognition sensor, an iris recognition sensor, or the like) to obtain biometric information.

Although not shown in FIG. 8, the first electronic device 810 and the second electronic device 820 may not include some of the elements described above. In another embodiment, the first electronic device 810 and the second electronic device 820 may further include at least one other element (for example, a digital broadcasting module, a camera, an interface module, an input device, a sensor module, or the like) which has an equal level to the above-described elements.

An electronic device (for example, the second electronic device 820 of FIG. 8) according to various embodiments of the present disclosure may include: a communication unit (for example, the communication unit 824) configured to connect a communication channel with at least one first external electronic device; and at least one processor (for example, the processor 821) functionally connected with the communication unit, and the at least one processor may be configured to: request, from the at least one first external electronic device, information (companion device authentication information) necessary for registering the at least one first external electronic device as a companion device of a second external electronic device, in response to the connection with the at least one first external electronic device; receive the companion device authentication information from the at least one first external electronic device and to store the companion device authentication information; register the electronic device as a companion device of the second external electronic device when the electronic device is connected with the second external electronic device; and transmit the stored companion device authentication information to the second external electronic device such that the at least one first external electronic device is registered as a companion device of the second external electronic device.

According to various embodiments, the processor may be configured to further perform user authentication when the electronic device is connected with the second external electronic device.

According to various embodiments, the companion device authentication information may include a device type, a device ID, a public key, and a device unique address.

According to various embodiments, the electronic device may further include a memory (for example, the memory 822) including a security area configured to store the companion device authentication information.

According to various embodiments, the processor may be configured to further perform authentication when the electronic device is connected with the at least one first external electronic device, and to request the at least one authenticated first external electronic device to transmit the companion device authentication information.

According to various embodiments, the processor may be configured to register the electronic device as the companion device of the second external electronic device by using a companion device framework.

An electronic device (for example, the first electronic device 810 of FIG. 8) according to various embodiments of the present disclosure may include: a communication unit (for example, the communication unit 814) configured to connect a communication channel with at least one first external electronic device; and at least one processor (for example, the processor 811) functionally connected with the communication unit, and the at least one processor may be configured to: register the at least one first external electronic device as a companion device of the electronic device in response to the connection with the at least one first external electronic device; receive companion device authentication information regarding at least one second external electronic device from the at least one first external electronic device; and register the at least one second external electronic device as a companion device, based on the received companion device authentication information.

According to various embodiments, the processor may be configured to further perform user authentication when the electronic device is connected with the at least one first external electronic device.

According to various embodiments, the processor may further include a memory (for example, the memory 812) configured to store information regarding the registered companion devices.

According to various embodiments, the processor may register the at least one first external electronic device as the companion device by using a companion device framework.

The term "module", as used herein, may refer, for example, to a unit including hardware, software, and firmware, or any suitable combination thereof. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include, for example, and without limitation, at least one of a dedicated processor, a CPU, an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction.

The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

According to various embodiments, the non-transitory computer readable recording medium may store at least one instruction configured to cause at least one processor, when executed by the at least one processor, to perform at least one operation. The at least one operation may include: connecting, by the electronic device, with at least one first external electronic device; requesting, by the electronic device, connection information (companion device authentication information) necessary for registering the at least one first external electronic device as a companion device of a second external electronic device from the at least one first external electronic device; receiving the companion device authentication information from the at least one first external electronic device, and storing the companion device authentication information; and registering the electronic device as a companion device of the second external electronic device when the electronic device is connected with the second external electronic device, and transmitting the stored companion device authentication information to the second external electronic device such that the at least one first external electronic device is registered as a companion device of the second external electronic device.

According to various embodiments, the non-transitory computer readable recording medium may store at least one instruction configured to cause at least one processor, when executed by the at least one processor, to perform at least one operation. The at least one operation may include the operations of: connecting the electronic device with at least one first external electronic device; registering the at least one first external electronic device as a companion device of the electronic device; receiving companion device authentication information regarding at least one second external electronic device from the at least one first external electronic device; and registering the at least one second external electronic device as a companion device.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The embodiments disclosed in the present disclosure are suggested for easy explanation and understanding of the disclosed technical features, and are not intended to limit the scope of the present disclosure. Therefore, the scope of the present disclosure should be interpreted as including all changes or modified forms derived based on the technical idea of the present disclosure.

What is claimed is:

1. An electronic device comprising:
    a communication circuit configured to connect, via a communication channel, with at least one first external electronic device; and
    at least one processor functionally connected to the communication circuit,
    wherein the at least one processor is configured to:
        request, from the at least one first external electronic device, companion device authentication information necessary for registering the at least one first external electronic device as a companion device of a second external electronic device, in response to connecting with the at least one first external electronic device;
        receive the companion device authentication information from the at least one first external electronic device and store the companion device authentication information; and
        in response to the electronic device being connected with the second external electronic device:
            register the electronic device as a companion device of the second external electronic device, and
            transmit the stored companion device authentication information to the second external electronic device such that the at least one first external electronic device is registered as the companion device of the second external electronic device,
    wherein the second external electronic device connects with the electronic device or the at least one first external electronic device automatically in response to detecting that the electronic device or the at least one first external electronic device is within a predetermined distance from the second external electronic device, after the registration of the companion device is completed, and wherein the at least one processor is configured to register the electronic device as the companion device of the second external electronic device by using a companion device framework.

2. The electronic device of claim 1, wherein the at least one processor is configured to further perform user authentication when the electronic device is connected with the second external electronic device.

3. The electronic device of claim 1, wherein the companion device authentication information comprises at least one of: a device type, a device ID, a public key, or a device unique address.

4. The electronic device of claim 1, further comprising a memory comprising a security area configured to store the companion device authentication information.

5. The electronic device of claim 1, wherein the at least one processor is further configured to:
perform authentication when the electronic device is connected with the at least one first external electronic device, and
request the at least one first external electronic device to transmit the companion device authentication information.

6. An electronic device comprising:
a communication circuit configured to connect, via a communication channel, with at least one first external electronic device; and
at least one processor functionally connected to the communication circuit,
wherein the at least one processor is configured to:
register the at least one first external electronic device as a companion device of the electronic device in response to connecting with the at least one first external electronic device;
receive, from the at least one first external electronic device, companion device authentication information necessary for registering at least one second external electronic device as a companion device of the electronic device;
register the at least one second external electronic device as the companion device of the electronic device, based on the companion device authentication information received from the at least one first external electronic device; and
connect with the at least one first external electronic device or the at least one second external electronic device automatically in response to detecting that the at least one first external electronic device or the at least one second external electronic device is within a predetermined distance from the electronic device, after the registration of the companion device is completed,
wherein the at least one processor is configured to register the at least one first external electronic device as the companion device of the electronic device by using a companion device framework.

7. The electronic device of claim 6, wherein the at least one processor is further configured to perform user authentication when the electronic device is connected with the at least one first external electronic device.

8. The electronic device of claim 1, wherein the at least one processor further comprises a memory configured to store information regarding the registered companion devices.

9. A method for managing a companion device of an electronic device, the method comprising:
connecting, by the electronic device, with at least one first external electronic device;
requesting, by the electronic device, companion device authentication information necessary for registering the at least one first external electronic device as a companion device of a second external electronic device from the at least one first external electronic device;
receiving the companion device authentication information from the at least one first external electronic device, and storing the companion device authentication information; and
in response to the electronic device being connected with the second external electronic device, registering the electronic device as a companion device of the second external electronic device and transmitting the stored companion device authentication information to the second external electronic device such that the at least one first external electronic device is registered as a companion device of the second external electronic device,
wherein the second external electronic device connects with the electronic device or the at least one first external electronic device automatically in response to detecting that the electronic device or the at least one first external electronic device is within a predetermined distance from the second external electronic device, after the registration of the companion device is completed, and
wherein the registering the electronic device as the companion device of the second external electronic device comprises registering the electronic device as the companion device of the second external electronic device by using a companion device framework.

10. The method of claim 9, further comprising performing user authentication when the electronic device is connected with the second external electronic device.

11. The method of claim 9, wherein the companion device authentication information comprises at least one of: a device type, a device ID, a public key, or a device unique address.

12. The method of claim 9, wherein the storing comprises storing the companion device authentication information in a security area of a memory.

13. The method of claim 9, further comprising performing authentication when the electronic device is connected with the at least one first external electronic device,
wherein the requesting comprises requesting the at least one first external electronic device to transmit the companion device authentication information.

* * * * *